US006859789B1

(12) United States Patent
Hayashi et al.

(10) Patent No.: US 6,859,789 B1
(45) Date of Patent: Feb. 22, 2005

(54) INFORMATION RECORDING MEDIUM AND INFORMATION PROCESSING DEVICE

(75) Inventors: Nobuhiro Hayashi, Kanagawa (JP); Munekatsu Fukuyama, Tokyo (JP)

(73) Assignee: Sony Corporation, Tokyo (JP)

( * ) Notice: Subject to any disclaimer, the term of this patent is extended or adjusted under 35 U.S.C. 154(b) by 700 days.

(21) Appl. No.: 09/638,572

(22) Filed: Aug. 14, 2000

(30) Foreign Application Priority Data

Aug. 17, 1999 (JP) .......................................... 11-230381

(51) Int. Cl.[7] .............................................. G06F 17/60
(52) U.S. Cl. ............................. 705/50; 705/51; 705/54; 705/57
(58) Field of Search ............................... 705/1, 50, 51, 705/57, 54

(56) References Cited

U.S. PATENT DOCUMENTS

| | | | | | |
|---|---|---|---|---|---|
| 4,531,167 | A | * | 7/1985 | Berger | 360/77.02 |
| 5,383,065 | A | * | 1/1995 | Hayashi | 360/67 |
| 5,499,298 | A | * | 3/1996 | Narasimhalu et al. | 705/54 |
| 5,867,337 | A | * | 2/1999 | Shimomura | 360/75 |
| 6,098,056 | A | * | 8/2000 | Rusnak et al. | 705/75 |
| 6,209,092 | B1 | * | 3/2001 | Linnartz | 713/176 |
| 6,330,624 | B1 | * | 12/2001 | Cromer et al. | 710/37 |
| 6,487,032 | B1 | * | 11/2002 | Cloke et al. | 360/51 |

FOREIGN PATENT DOCUMENTS

JP          10133955 A    *  5/1998    .......... G06F/12/14

OTHER PUBLICATIONS

"Closure Near on PC–Related DVD Copy Protection Issues", Consumer Electronics, v37, n21, May 26, 1997.*

* cited by examiner

*Primary Examiner*—John W. Hayes
*Assistant Examiner*—Calvin L. Hewitt, II
(74) *Attorney, Agent, or Firm*—Frommer Lawrence & Haug LLP; William S. Frommer; Hans R. Mahr

(57) ABSTRACT

An information recording medium and information processing device capable of preventing recording and reproduction of information by unauthorized users not possessing a genuine licensed disk device. A public key for a particular medium and a secret key are recorded on a medium and, a secret key for deciphering the encoding is recorded on a normally inaccessible region of the medium to prevent a user from downloading and altering the secret key with external commands. Information encoded by the public key of a particular device can only be decoded by the secret key of this device or a decipher key decodable only by the secret key, and recording or reproduction of decoded data is only possible on the genuine licensed device, and illegal recording or reproduction of data can therefore be prevented.

1 Claim, 11 Drawing Sheets

INFORMATION RECORDING MEDIUM AND INFORMATION PROCESSING DEVICE

BACKGROUND OF THE INVENTION

1. Field of the Invention

This invention relates to disk information recording medium and information processing device capable of recording and reproducing data such as magnetic disk and optical disk data, and relates in particular to a digital data recording and reproducing device capable of recording and reproducing digital data for preventing the illegal recording or illegal reproducing of audio-visual data reproduced or recorded on a magnetic disk device by a personal computer after being received or accepted by way of a network, broadcast or other record medium, in order to protect the copyrights of the writer or author.

2. Description of the Related Art

In recent years, information such as music and video is being distributed by way of networks and broadcasts, received via means such as the Internet, and shown on displays such as the personal computers of individuals, or spread by network data distribution systems and recorded onto devices such as magnetic disk devices and magneto-optical disc devices connected to personal computers.

Users having for instance, a personal computer connected to the Internet may show the received digital information from the Internet on a display and such actions are generally understood to be allowed by the copyright holder of the information being presented. However, recording such information on a magnetic disk, optical disk or other record medium requires the special consent of the copyright holder. In order to restrict the recording of distributed information onto the magnetic disk, optical disk or other record medium of an individual, a key for instance is stored beforehand to indicate whether or not recording of the information onto a disk device is allowed. This key is configured to certify whether or not that disk is a legitimate device, in other words, whether the device has been granted a license from the provider of the information. When certified as a legitimate device, the recording of information onto that disk device is allowed.

Characteristic information (ID information) for identifying the information recording device or the record medium is embedded in the system receiving the transmitted information, as a method to certify whether or not the device of the receiver is the device that received appropriate consent, or in other words that the device used by the receiver is correctly licensed to receive, and record or reproduce that information transmitted from the information provider.

During distribution of the information, the provider of the information checks between the provider side and information receiver device whether or not the device is legitimately licensed based on the characteristic information (ID information). If verified that that the device is a legitimate device, then recording is performed normally, and if not a legitimately licensed device then recording is not performed.

In an alternative method, the recording of information is allowed on any device whatsoever and the reproduction (or playback) of illegal copies prevented by making a check for the license during information reproduction.

Characteristic information (ID information) to identify the medium or the device, is recorded prior to shipment at a specific position on the data recording section of the medium so as not to overlap.

The above configuration to prevent illegal copying is shown in FIG. 11, in a typical data communication by way of a communications network such as the Internet.

In the drawing in FIG. 11, an information provider 1100 is connected to a plurality of information receiving users 1101, 1102, and 1103, in a configuration capable of mutual exchange of information.

The user attempting to record information received from the information provider 1100 on a storage device such as the hard disk of the user's personal computer, makes a data distribution request to the information provider 1100 by way of the network, and the user transmits his own ID to the information provider 1100.

When the information provider 1100 receives the ID from the user, the ID is then compared with ID registered in the registered ID data base 1120, and if the user ID matches the data in the registered ID data base 1120 then the data distribution request is treated as a request from a genuine licensed user, and data (P) is extracted from the data base 1110 and provided to the user. In this case, the data can be transmitted for instance as encoded data.

When results of a comparison of the ID from the user with the ID stored in the registered ID data base 1120 do not show a match, then the data request is determined not to be a request from a genuine licensed user, and data is not sent.

In this kind of a system, the information receiving users 1101, 1102, 1103 are generally individual personal computers, and the system comprises a device such as magnetic disk devices capable of recording data and having data communication means. The user ID may be an ID created by the user, or an ID recorded beforehand as system characteristic information (ID information) prior to shipment, in a specified position of the data recording section of the medium.

The information provider 1100 is linked to the user beforehand by the license and in such cases, the characteristic information (ID information) of the information receiving users 1101, 1102, 1103 is registered in the registered ID data base 1120. The information provider 1100 compares the ID information transmitted from the information receiving users 1101, 1102, 1103 with the registered ID data, and decides whether or not the user transmitted ID matches the registered ID data. If the user ID and registered ID are a match, then the user is recognized as a legitimate user, and for instance, the distributed information is encoded with a specified key k, and this key transmitted to the information receiving users 1101, 1102, 1103.

A value obtained by applying a specific function f to the device ID transmitted by any of the information receiving users 1101, 1102, 1103 can be generated as the key: k (=f (ID). In the same way, on the information receiver side, a constant f can be applied to the ID to generate a key: k (=f (ID). Then, by utilizing that key k, the encoded music or video data transmitted from the information provider can be decoded.

However, in the conventional art, the characteristic information (ID information) for the information receiver device possessed by the user is an ID that was set by the user, or an ID recorded prior to shipment, on a specified position of the data record section of the medium. These kinds of ID that are set as desired by the user or are recorded prior to shipment, on the data record section of the medium are capable of being easily rewritten. Since ID recorded on the data section of the record medium such as a hard disk are capable of easily being rewritten by user operation from the host computer, the ID is vulnerable to alternation or falsification.

To prevent alteration to produce an illegal (false) ID, a program may be used for instance to control the disk drive so that rewriting of the section recorded with the ID information is impossible. However, the person attempting to make an illegal copy might use methods such as rewriting that control program so the possibility of rewriting data in that area still remains.

An illegal user therefore, might rewrite an ID held in an electronic device, changing the ID to the ID of a user possessing a genuine license so that the illegal user can then make an illegal recording of received data. Also, by copying a genuine ID to a plurality of devices, the possibility arises of a plurality of devices being capable of making illegal recordings of received data.

Therefore, the method of recording ID information on the data section of a medium in the system of the conventional art had the problem that illegal copying cannot be prevented. Furthermore, methods to make altering the ID difficult by recording characteristic (ID) information on the servo information record area in the medium or the device were proposed but even if altering the characteristic ID on a record medium became impossible, characteristic (ID) information such as the serial number of the magnetic disk was public information so that illegal users not having a genuine licensed disk device might steal the characteristic ID of the record medium of another party holding a genuine license, present the illegally acquired genuine ID to the information provider as if they were licensed user, and then acquire information illegally.

Another problem with the related art is that if characteristic ID information of a medium is received for instance via a broadcast or network, then that ID information can be altered or changed to the ID information of another device or medium and illegal copying then performed on that medium or device.

SUMMARY OF THE INVENTION

In view of the above problems with the related art, this invention has the object of providing an information recording medium and information processing device capable of preventing recording and reproduction of information by unauthorized users not possessing a genuine licensed disk device.

In a first aspect of the invention, a disk information recording medium capable of recording and reproducing data is characterized in that, the disk information recording medium is a data zone capable of recording or reproducing data and, having a special data record region accessible only with custom commands and, having at least a region recorded with a secret key as key information for the public key code system in the custom data record region.

The embodiment of the information recording medium of the invention is further characterized in that the public key used as the key information of the public key code system is recorded in the dedicated data record region.

The embodiment of the information recording medium of the invention is still further characterized in that the dedicated data record region is formed as a dedicated data record region track in a portion of the plurality of tracks formed in the disk information recording medium, and the dedicated data record region track is formed in a track region not normally accessible by data recording or reproduction commands.

The embodiment of the information recording medium of the invention is also characterized in that the dedicated data record region track possesses an address other than the track address accessible by normal data recording or reproduction commands.

The embodiment of the information recording medium of the invention is yet further characterized in that the dedicated data record region is a track region formed further towards the inner circumference from the disk innermost circumferential track accessible by normal data recording or reproduction commands.

In a second aspect of the invention, the disk information recording medium is a data zone capable of recording or reproducing data and, the head for recording or reproducing of data possesses a servo zone recorded with servo information for positioning the head with respect to the information recording medium, and the servo zone is recorded with at least a secret key as key information for the public key coding system.

Further the embodiment of the information recording medium of the invention, is characterized in that a public key used as the key information of the public key code system is recorded in the servo zone.

Still further, the embodiment of the disk information recording medium of the invention, is characterized in being alternately formed of a plurality of data zones and a plurality of servo zones and, the key information of the public key code system is recorded in at least one of the plurality of servo zones.

Also the embodiment of the disk information recording medium of the invention, is characterized in that key information of the public key code system is formed into one key information by linking the information recorded in the plurality of servo zones.

The embodiment of the disk information recording medium of the invention, is yet further characterized in that the servo zone contains a track address recording area recorded with track addresses for identifying the data tracks of a disk and, the key information of the public key code system is recorded in the track address recording area.

The embodiment of the disk information recording medium of the invention, is still further characterized in that the same key information for the public key code system is recorded in a different servo zones among the plurality of servo zones.

In a third aspect of the invention, an information processing device comprising a disk information recording medium capable of recording and reproducing data, is characterized in that the disk information recording medium is a data zone capable of recording or reproducing data and, has a dedicated data record region accessible only with custom commands and, is recorded in the dedicated data record region with at least a secret key as key information for the public key code system.

The embodiment of the information processing device of the invention, is characterized further in that in the information recording medium, a public key used as key information of the public key code system is recorded in the dedicated data record region.

The embodiment of the information processing device of the invention is also characterized in that a dedicated data record region is formed in a portion of the servo zone in the disk information recording medium.

The embodiment of the information processing device of the invention is yet further characterized in having dedicated command issue means for accessing data in the dedicated data record region of the disk information recording medium.

The embodiment of the information processing device of the invention is also characterized in comprising secret key loading means for loading the secret key from the information recording medium and, encoded data input means for inputting data encoded by the public key and, decoding means for decoding the encoded data by using the secret key.

The embodiment of the information processing device of the invention is also characterized in comprising public key loading means for loading the public key recorded on the information recording medium and, public key output means for externally outputting the public key loaded by the public key loading means.

The embodiment of the information processing device of the invention is also characterized in comprising memory processing means for storing in a storage device, data decoded in the decoding means.

The embodiment of the information processing device of the invention is still further characterized in comprising an information processing device having reproduction means for reproducing encoded data from the storage device, and decoding data output means for externally outputting decoded data obtained as decoded results in the decoding means from encoded data reproduced in the reproduction means.

The embodiment of the information processing device of the invention is even further characterized in comprising secret key loading means for loading the secret key from the information recording medium and; encoded decipher key decode means for decoding the decipher key encoded by the secret key, and then generating a decoded decipher key by means of the secret key and; a decipher key to decode the encoded data.

The embodiment of the information processing device of the invention is further characterized in comprising public key loading means for loading a public key recorded in the information recording medium and, public key output means for externally outputting the public key loaded by the public key loading means.

Still further, the embodiment of the information processing device of this invention is characterized in comprising memory processing means for storing data decoded in the decoding means, in the storage device.

The embodiment of the information processing device of the invention is also characterized in comprising reproduction means for reproducing encoded data from the storage device and, decoding data output means for externally outputting decoded data obtained as decoding results in the decoding means for encoded data reproduced by the reproduction means.

The disk information recording medium and information processing device of the invention is essentially capable of preventing recording and reproduction of information on other than genuine licensed mediums or devices, when recording or reproducing copyrighted information such as computer operated software, or audio information or video information on a recording device.

DESCRIPTION OF THE PREFERRED EMBODIMENTS

The preferred embodiments of this invention are hereafter described in detail while referring to the accompanying drawings. In the following embodiments, a magnetic disk is described as the information recording medium however this invention is not limited to a magnetic disk device and is also applicable for instance to all information record media capable of recording and reproducing data, such as optical magnetic disks and optical disk, etc.

First Embodiment

The first embodiment of the information recording medium and information processing device of this invention is described next. The magnetic disk device of this embodiment has a public key and a secret key utilized in the public key encoding system for instance as characteristic (ID) information for the disk medium. The public key and secret key are recorded beforehand in a location other than the area normally assigned for recording and reproduction of data.

The disk medium normally used in the magnetic disk device has data tracks formed in a concentric circular shape on the disk, and a track address assigned in sequence to all tracks for performing record/reproduction, starting from the internal circumference of the disk such as Track 0, Track 1. Track sector positions are designated for recording or reproducing data based on the various servo information and these address tracks, and the user data are then recorded or reproduced.

When there are n number of data record/reproduction tracks formed on the disk, then track addresses from 0 to n−1 are assigned to each corresponding track as servo information, on the servo information region of the disk. The record/reproduction head moves to the target track address position based on this servo information and starts recording or reproducing data.

When there are n number of tracks formed on the disk constituting the disk medium of this invention, the track numbers specified by the disk address start not from 0 but for instance from −1, and track addresses are assigned from −1 to n−2 for n number of tracks.

Figure 1:
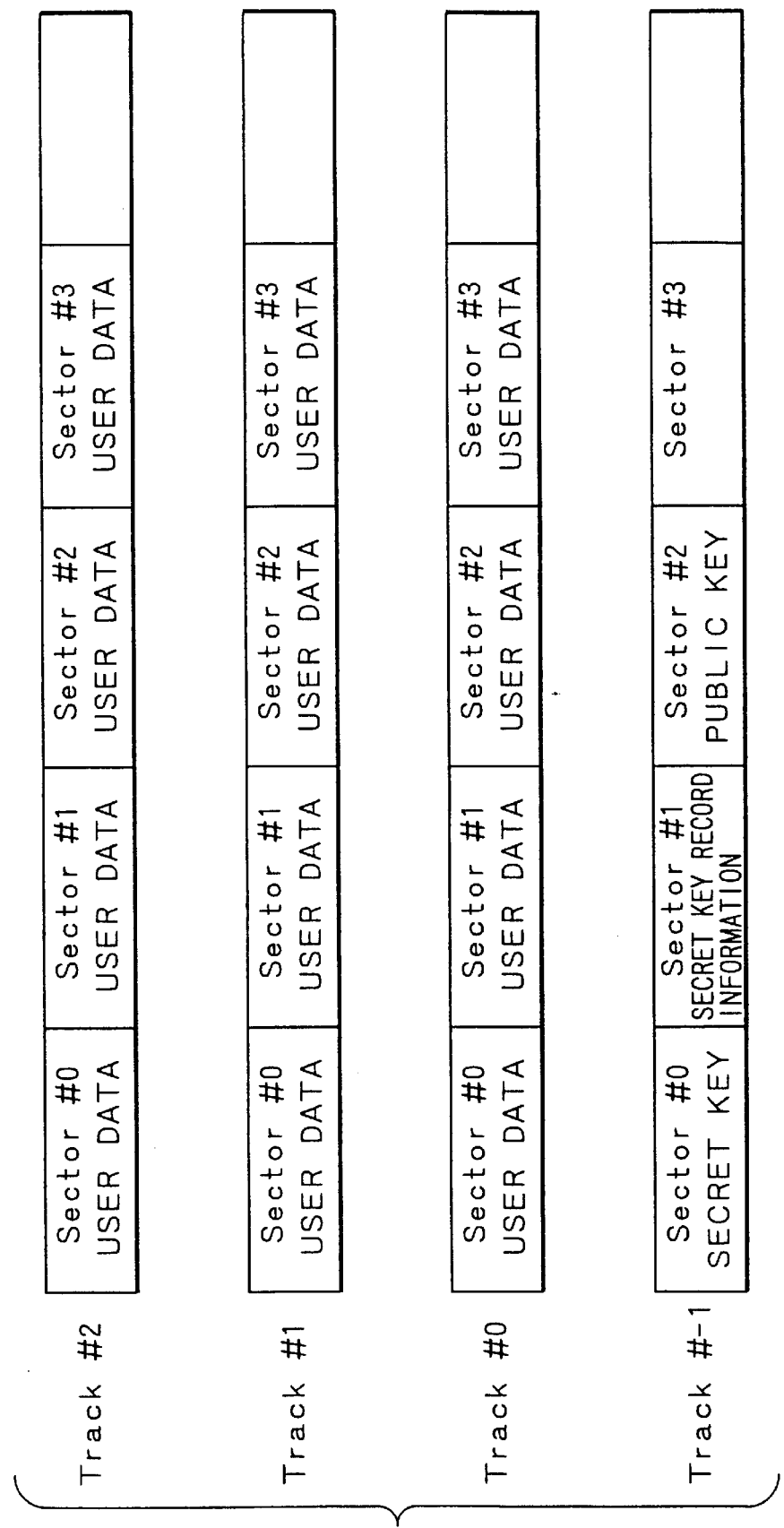
FIG. 1 is a drawing showing the disk format of a magnetic disk applicable to the information processing device having the information recording medium of the invention.

A portion of the data configuration for a track of this invention is shown in FIG. 1. As shown in FIG. 1, a secret key and a public key utilized in the public key encoding system as the disk medium characteristic information are recorded on Track: −1. In other words, Track −1 is a dedicated data record region, recorded with a secret key and a public key. In the example in FIG. 1, the secret key is recorded on Sector #0 of Track −1, the secret key record information is recorded on Sector #1 of Track −1, and public key is recorded on Sector #2 of Track −1.

Here, when accessing the disk from the computer by way of the IDE (Integrated Device Electronics) interface, by making assignments so that the logic block address of 0 starts from sector 0 of track 0 of the disk, the disk device is recognized as having a capacity from Track 0 to Track n−2.

The data read or data write commands coming by way of the interface, do not recognize Track −1 as a region for the recording and reproduction of normal data. Therefore, access is not possible by way of the IDE interface constituting the standard interface for exchange of data between the storage device and external devices. However, dedicated commands such as vender unique commands not defined by standards such as IDE, or additional commands can utilize this information, in other words can access the information of Track −1.

When a secret key record command defined as a dedicated command is for example received, and is recorded on a pre-determined region such as the Sector #0 of Track −1, the secret key record information indicating the secret key is further recorded on a Sector #1 of Track −1 as shown in FIG. 1, and the disk device shipped with this key information and secret key record information recorded on Track −1.

The example here described using an IDE as the interface for the disk drive device and host computer, however this invention can also be applied preferably to disk drive devices connected to general purpose computer systems by expanded IDE and SCSI and other interfaces. This invention is also applicable to systems utilizing PC card interfaces having various protocols (PC Card ATA 68pin ATA True IDE etc.) defined for hardware devices having PC card standards established by PCMCIA and JEIDA.

When a new information record command is received by a disk device already recorded on Track −1 with a secret key and secret key record information, first of all, the secret key record information of Sector #1 of Track −1 is reproduced, and if the secret key record information shows that a secret key is already recorded, then recording of the new secret key is not performed and an error issued. In this way, the user is assured that recording of the secret key is performed only once, and the rewriting of the secret key record region by the user is prevented.

A secret key load command is not defined among the dedicated commands and by not allowing a secret key load command to be present, the external loading of a secret key temporarily recorded on a disk is prevented.

The public key is recorded for instance on Sector #2 of Track −1 as shown in FIG. 1. Public key record/reproduction information can be recorded or loaded to an external destination by means of dedicated commands. This key contains essential information so in order to improve reliability; the same key information may be recorded on a plurality of sectors to improve the fail-safe characteristics of the system.

The innermost circumference of the disk in FIG. 1 was utilized as the secret key and public key information record region position constituting the dedicated data record region, however the region for recording the secret key and public key may also be formed on the outermost circumferential region of the disk. Further, a dedicated address may be set as a track address matching optional track positions selected as regions to record the public key and secret key and configured so the head is only accessed by dedicated record/reproduction commands in this dedicated data record region and the head is not positioned by normal data record/reproduction commands. On disk formed with alternate data zones and servo zones, a dedicated data record region may be formed in the servo zone. This configuration is related in detail later on in the fifth embodiment.

Figure 2:
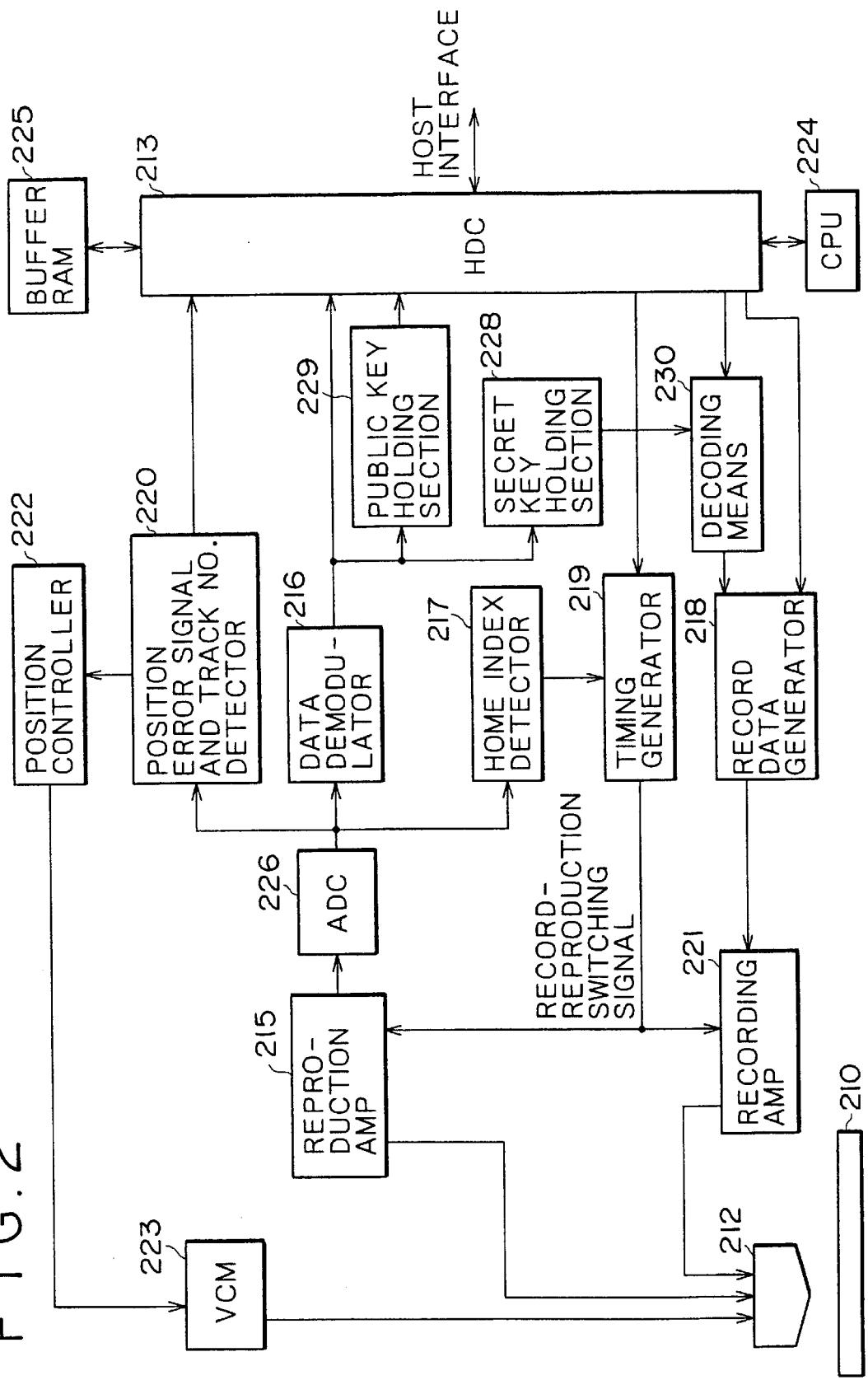
FIG. 2 is a block diagram showing the structure (first embodiment) of the information processing device of this invention.

A block diagram showing the embodiment of the magnetic disk device of this invention is shown in FIG. 2.

A signal reproduced from a magnetic disk 210 by a reproduction head 212, is amplified by a reproduction amplifier 215 and then converted into a digital signal by an A/D converter (ADC) 226.

A signal converted into a digital signal by the A/D converter (ADC) 226 is input to the position error signal and track No. detector 220, the track No. and position error signal detected in the position error signal and track No. detector 220 are input to a position controller 222 to perform positioning of the head 212 by driving a VCM223.

A circumferential position is designated by the home index detector 217 for the digital signal converted by the A/D converter (ADC) 226. Based on the circumferential position designated by the home index detector 217, a timing generator 219 controls the overall device timing including the data record/reproduction timing and the data is recorded or reproduced.

When receiving external video or music information from the information provider for a genuine licensed device, a public key information load (readout) command is first issued by a command from the host computer.

When the HDC213 receives this public key information load (read-out) command, a head 212 is moved by the position controller 222 to a track designated beforehand. A sector signal recorded with the public key information is reproduced, and transferred to the host computer by way of the hard disk controller 213.

The data of the applicable sector designated by the public key record address is loaded by issuing a public key information load (read-out) command defined as a dedicated command. In other words, the public key is loaded. In the sector recorded with the public key shown in FIG. 1, the public key information load (read-out) command is defined as a load command for the data of Sector #2, Track −1.

The information provider encodes the information provided based on the public key loaded and transferred to the user's system and the information is distributed by a communication means such as broadcasts or networks utilizing a removable media such as a CD-ROM.

When the information received by way of a network or provided by an information provider is recorded by a user constituting the information receiver, a command from the user's host computer performs recording of the information encoded with the public key.

When recording normal non-encoded user data on the magnetic disk 210, data is transferred directly to the record data generator circuit 218 without passing through the decoding means 230 shown in FIG. 2, and data is written by way of the record amplifier 221 and the head 212. However, after decoding of the secret key data in the decoding means 230, the decoded data is transferred to the record data generator 2199 and recorded on the disk.

The procedure when recording the data encoded by the public key on a disk is explained next. The command to execute decoding of encoded data and record processing is defined as a dedicated command the same as the above mentioned public key information load (read-out) command. When the user issues a decoding of encoded data and record processing command defined as a dedicated command, the head 212 moves to track −1 of the magnetic disk 210 to load the secret key information, the secret key data is read out from Sector #0 of Track −1, reproduced by the data demodulator 216, and input to the secret key holding section 228.

The encoded data comprising the information to be recorded is transferred by way of the host interface and the HDC213 is temporarily input to the buffer RAM225 by way of the HDC213. The encoded data is decoded by the decoding means 230 using the secret key held in the secret key holding section 228, or in other words decoding is performed. The decoded data is then written onto the magnetic disk 210 by the head 212 by way of the recording amplifier 221 and the record data generator 218.

The secret key is loaded from the secret key recording section by the above mentioned decoding and record processing commands for the encoded data, defined as dedicated commands, and held in the secret key holding section 228. In the decoding means 230, the data is decoded and the series of processing of the defined commands for recording the data on the medium is performed. In other words, the user is prevented from loading the secret key and tampering with the data, since the secret key data cannot be extracted by way of the host interface.

The data written onto a record medium such as a magnetic disk according to the above procedure is ordinary decoded text so that loading (read-out) the same as for normal data is possible when the user is reproducing information from the record medium.

The above example described recording both a secret key and a public key for a public key code system onto a dedicated data record region of the disk, however recording just the secret key onto the dedicated record region may be performed, so that the only the secret key cannot be reproduced with normal data record/reproduction commands.

Figure 3:
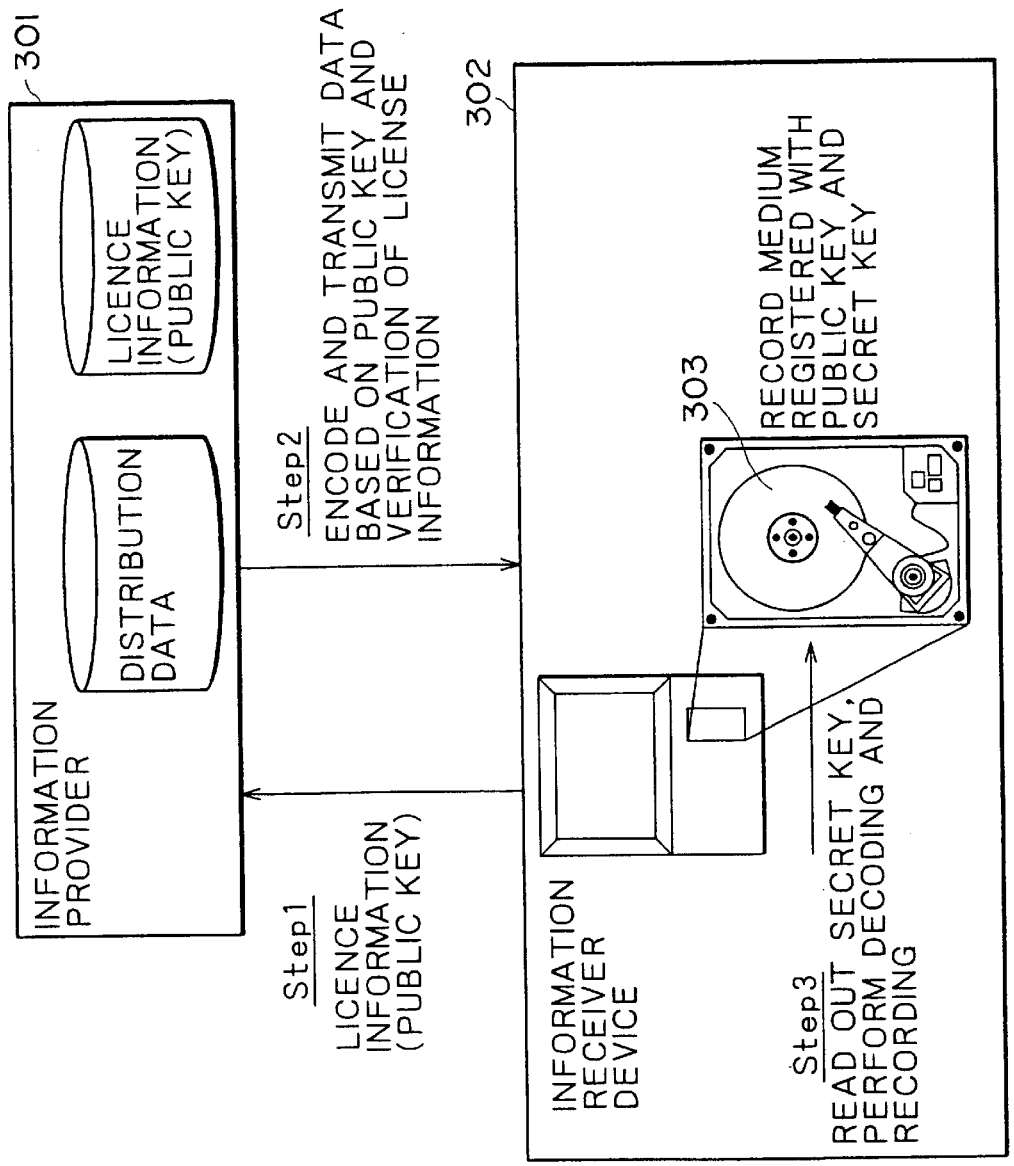
FIG. 3 is a drawing illustrating the recording process (first embodiment) for the storage device and the distribution of information utilizing the structure of the information processing device of this invention.

The process of the user having a disk recorded with this kind of secret key and public key information, acquiring a license, receiving the music information and video information, and recording such information on a record medium is next described while referring to FIG. 3.

An information receiver device 302 shown in FIG. 3 is a personal computer comprising a device having data communication means and capable of recording data on a magnetic disk 303, etc. The information receiver device 302 has a magnetic disk 303 recorded prior to shipping with characteristic (ID) public key and secret key information at a specific pre-arranged position on the medium such as Track −1, where access is denied during normal recording or reproduction of data.

Besides recording and reproducing ordinary data using a record medium such as the magnetic disk 303, the information receiver device 302 also utilizes a dedicated command to load (readout) the public key recorded on the public key record sector of the Track −1 of the medium.

When linking beforehand to an information receiver per a license, the information provider 301 registers the license information of the licensed information receiver device 302. The user public key information may be registered as the license information.

In step 1 as shown in FIG. 3, the information receiver device 302 receives the public key loaded with a dedicated command, from a communication means such as the Internet. The information provider 301 encodes the distribution data based on the public key received based on the license information and sends the encoded data to the information receiver device 302 (step 2).

The public key information utilized in the encoding is recorded on Track −1 of the above described information recording medium and the characteristic information is recorded during manufacture of the record medium so that the public key information cannot be rewritten by the user. The information provider 301 can therefore perform encoding compatible with a system that has received a genuine license. Data encoded based on a public key copied by an illegal user can also only be decoded by a paired secret key recorded on Track −1 of the same disk. A user who illegally copied a public key does not have a secret key paired with the public key so the illegally acquired encoded data cannot be decoded.

In step 2 as described above, the information provider 301 sends the encoded information for distribution, to the information receiver device 302 based on the public key having a now verified license. When the information receiver device 302 receives the encoded distribution data, the data decoding & storage command is issued as shown in FIG. 3 for step 3 and the encoded data is decoded and recorded. In other words, the head is moved to the secret key recording region of the magnetic disk and the secret key reproduced, the secret key reproduced by the data demodulation circuit is held in the secret key holding section, decoding of the distributed information performed by the encoding/demodulation means utilizing the reproduced secret key, and the decoded data recorded on the disk.

The information recording medium and information processing device of the above described embodiment, comprise a record medium recorded with a secret key and a public key utilized in the public key code system on a region where access is normally prohibited or in other words a region different from the data record/reproduction region. Therefore, by distributing encoded data from the information provider by means of the public key, and the information receiver constituted by the user loading the secret key and recording the now decoded data onto a medium when recording onto a record medium, those users not possessing the medium recorded with the public key and secret key cannot decode the distributed data, and only those users having a record medium with a genuine license can decode the encoded data, and perform recording of the data onto a record medium such as a magnetic disk.

Second Embodiment

In the first embodiment, information such as video or music from the information provider was encoded with the public key and sent so encoding was therefore required at the transmission destination. Though suited for distributing information to a limited number of individual users via networks, the method of the first embodiment has the problem that encoding was difficult for applications such as broadcasts that distribute the same information at one time to a large number of users.

In the second embodiment, information such as video or music is encoded using a common key and distributed, and a key to decode this information is encoded per a characteristic public key and transmitted to each user.

In this way, information such as video or music can be encoded with a common key and can be sent by methods such as broadcasts to a plurality of distribution destinations. The decipher key is a characteristic (ID) key for each device or in other words, is a public key encoded for a particular device and therefore the information for distribution cannot be recorded or reproduced on other devices.

Figure 4:
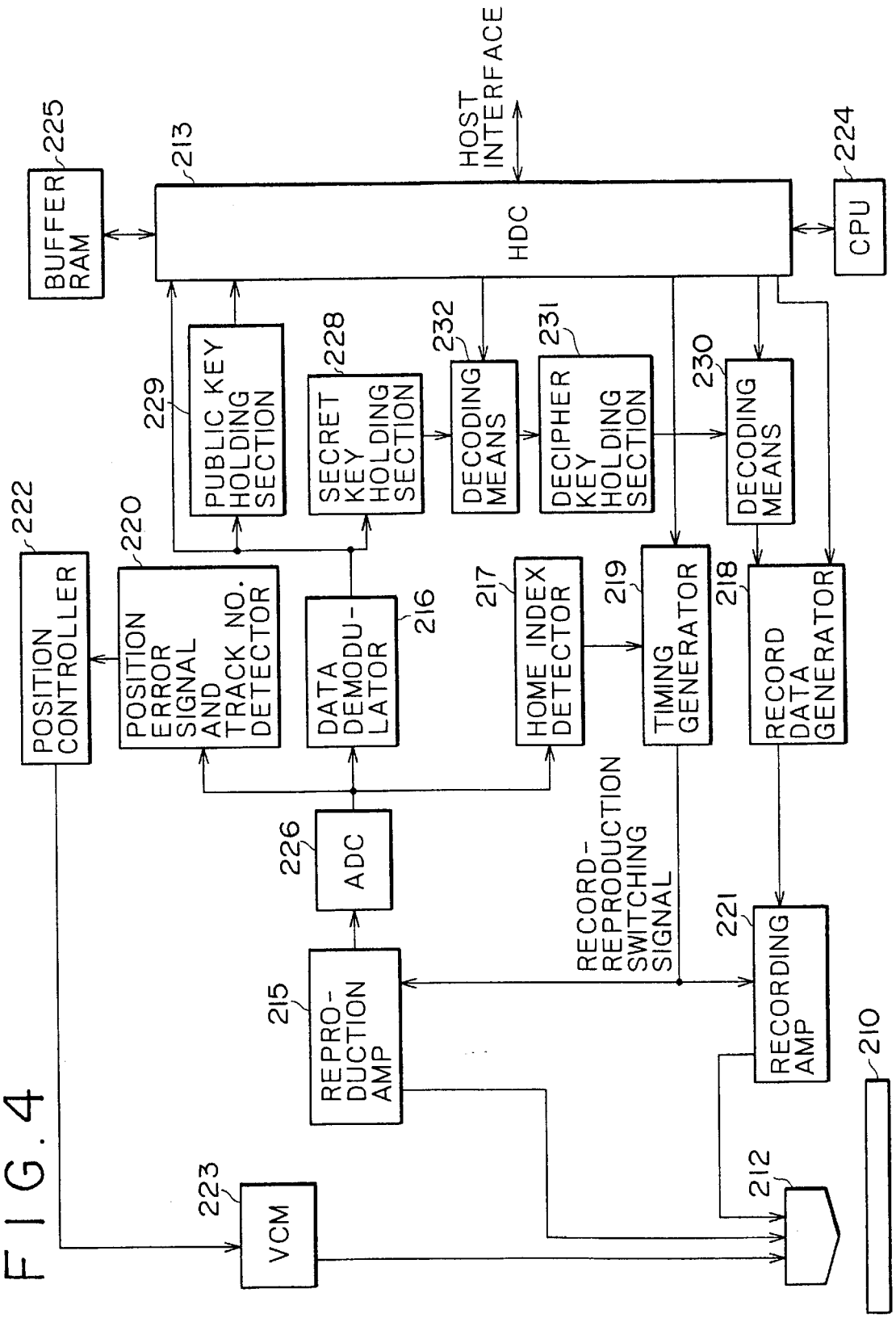
FIG. 4 is a block diagram showing the structure (second embodiment) of the information processing device of this invention.

A block diagram of the structure of the embodiment of the magnetic disk device relating to this invention is shown in FIG. 4.

A signal reproduced from the magnetic disk 210 by the magnetic head 212 is amplified by the reproduction amplifier 215 and then converted to a digital signal in the A/D converter (ADC) 226.

The signal converted to a digital signal by means of the A/D converter (ADC) 226 is input to a tracking servo signal detector circuit constituted by a position error signal and track No. detector 220. The track signal and the position error signal detected by the position error signal and track No. detector 220 are input to a position controller 222, and a head 212 is positioned by driving the VCM223.

A circumferential position on the disk is designated by a home index detector 217 for the signal converted to a digital signal by the A/D converter 226. Based on the circumferential position designated by a home index detector 217, the timing generator 219 controls the device overall timing including the record/reproduction timing and records and reproduces the data.

In the magnetic disk device of this embodiment, the same as with the first embodiment, the secret key and public key utilized in the public key code system are recorded on a location assigned beforehand that is not a normal data region, such a location for instance, is a specified sector of Track −1 as shown in FIG. 1. Therefore access is impossible during normal data record/reproduction. The loading (read-out) of this data must be implemented by dedicated commands, the same as in the first embodiment.

Accessing information recorded on these dedicated data regions, utilizes vendor-unique commands (dedicated commands) the same as in the first embodiment, not defined by standards such as IDE. This embodiment, the same as the first embodiment can also be satisfactorily applied to disk drive device types connected to general purpose computer systems by expanded IDE, SCSI or other interfaces. This embodiment is also applicable to systems utilizing PC card interfaces having various protocols (PC Card ATA 68pin ATA True IDE etc.) defined for hardware devices having PC card standards established by PCMCIA and JEIDA.

The secret key record commands, public key record/reproduction command, and data decoding & storage commands are defined as dedicated commands the same as for the first embodiment. In this embodiment, a decipher key input command is further defined as dedicated command. When this decipher key input command is input byway of the host interface, along with (encoded) decipher key information from the host computer, the encoded decipher key is input to the decoding means 232.

In the structure of this embodiment, when information from the information provider such as external music or video for distribution is received by a genuine licensed device, a public key information load (read-out) command is first of all issued from the host computer.

When the HDC213 receives this public key information load (read-out) command, the head 212 is moved to a pre-designated position by the position controller 222, a signal is issued from the sector recorded with the public key information and transferred to the host computer via the hard disk controller 213.

The data for the applicable sector designated by the public key record address is loaded (read out) by issuing the public key information load (read-out) command defined as a dedicated command. In other words, the public key is read-out (or loaded). In the example for recording a public key on the sector position shown in FIG. 1, the public key information load (read-out) command is defined as a command for read out of data from Track −1, Sector No. 2.

The information provider encodes the information for distribution by using a common key, and this information is distributed to non-designated receiver persons by using removable media such as CD-ROMs, networks such as the Internet, and broadcasts. The information provider further encodes the decipher key based on the public key read out from the user system and transmits this information. The decipher key is generated as a key capable of decoding the information for distribution that was encoded by using the common key.

In other words, the decipher key that was encoded based on the public key read out from the user system and transmitted, is only decodable by means of the secret key recorded in the same user system. The distributed data can be decoded by means of the decipher key whose encoding was decoded.

The information provider encodes the information for distribution by using the common key, and along with distributing this information to non-designated receiver persons, also distributes a decipher key to the user that was decoded based on the public key read out and transmitted from the user system.

When the information receiver constituted by the user, records information received by way of a network or provided by the information provider, information specified as encoded information is recorded by a command from the host computer of the user.

When recording normal non-encoded user data onto the magnetic disk 210, the data is sent straight to the record data generator 218 as shown in FIG. 4 without passing through the decoding means 230 and the data is written by the head 212 and the record amplifier 221. However, when storing encoded data, after decoding by the decipher key in the decoding means 230, the decoded data is sent to the record data transfer generator 218 and recorded onto the disk.

The procedure for recording encoded data onto the disk is explained next. The user first issues a decipher key input command. When the decipher key input command is by way of the host interface, along with information on the (encoded) decipher key, the decipher key is then input to the decoding means 232.

The command to decode the encoded data and implement memory storage processing is next issued. When the user issues this dedicated command, the head 212 moves to Track −1 of the magnetic disk 210 to load (read out) the secret key, the secret key data is read out from Track −1, Sector No. 0 and the secret key reproduced by the data demodulator 216. The secret key is held in the holding section 228, and the decoding means 232 utilizes the reproduced secret key, to decipher (decode) the decipher key transmitted from the information provider. The decipher key generated by this decode processing is held in the decipher key holding section 231.

The encoded data comprising the information to be recorded that was transmitted by the host interface and HDC213, is temporarily input to the buffer RAM225 by way of the HDC213. The encoded data is decoded in the decoding means 230, by utilizing the decipher key held in the decipher key holding section 231 or in other words decoding is performed. The data is written onto the magnetic disk 210 by the head 12 after first passing through the record generator 218 and the record amplifier 221.

The data decoding & storage command defined above is a dedicated command defined as series of processes in which the secret key is read out from the secret key storage section and the secret key held in the secret key storage section 228, decoding of the encoded decipher key performed in the decoding means 232 utilizing the reproduced secret key, the decoded decipher key held in the decipher key holding section 231, and decoding of the data performed in the decoding means 230 by using this decipher key and the data recorded on the medium. This data decoding & storage command only implements read out of the secret key or in other words, the secret key cannot be extracted by way of the host interface so that the user is prevented from tampering with the secret key.

The data written onto the record medium such as the magnetic disk in the above procedure is ordinary text decoded from the encoded information, and read out (or loading) the same as the procedure for normal data can be performed when the user is reproducing information from the record medium.

In the example described in the above embodiment, both the secret key and the public key of the public key code system were recorded on the dedicated data record region of the disk, however just recording the secret key on the dedicated data record region so that just the secret key cannot be reproduced with the normal data record/reproduction command is also acceptable.

The process when a user having a disk recorded with the secret key information and this kind of public key, acquires a license, receives distributed information such as music information or video information and records such information on a record medium is described next, while referring to FIG. 5.

Figure 5:
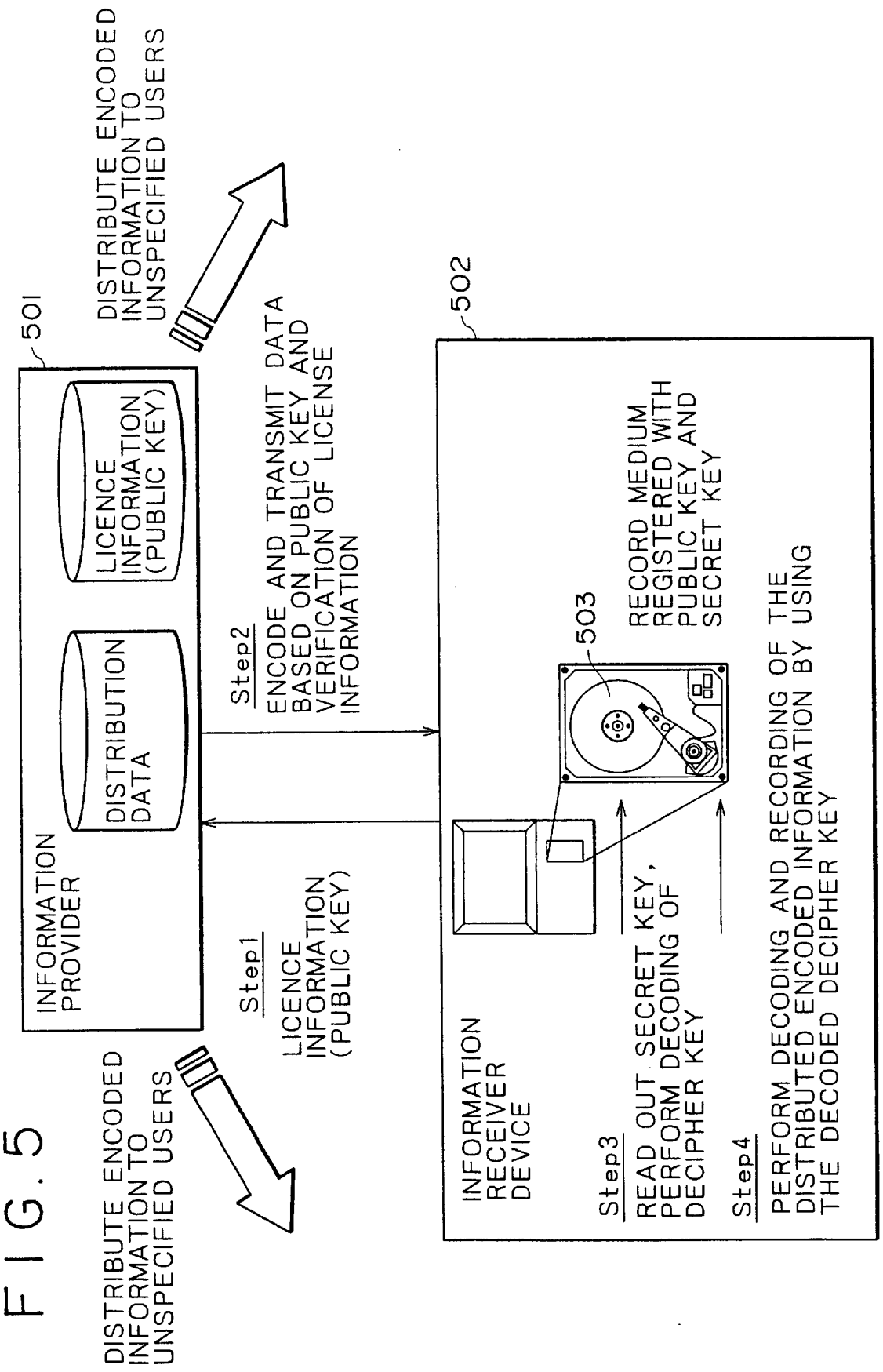
FIG. 5 is a drawing illustrating the recording process (second embodiment) for the storage device and the distribution of information utilizing the structure of the information processing device of this invention.

An information receiver device 502 shown in FIG. 5 is a personal computer comprising a device having a data communication means and capable of recording data on device comprising a magnetic disk 503, etc. The information receiver device 502 has a magnetic disk 503 recorded prior to shipping with a characteristic (ID) public key and secret key information at a specific pre-arranged position on the medium such as Track −1 where access is denied during normal recording or reproduction of data.

Besides recording and reproducing ordinary data using a record medium such as the magnetic disk 503, the information receiver device 502 also utilizes a dedicated command to load (readout) the public key recorded on the public key record sector of the Track −1 of the medium.

The information provider 501 distributes the encoded information for a non-designated large number of users. When linking a license and a designated information receiver, the information provider 301 registers the license information of the licensed information receiver device 502. The user public key information may be registered as the license information.

In step 1 as shown in FIG. 5, the information receiver device 502 receives the public key loaded with a dedicated command, from a communication means such as the Internet. The information provider 301 encodes the distribution data based on the public key received based on the license information and sends the encoded data decipher key to the information receiver device 502 (step 2).

The public key information utilized in the encoding is recorded on Track −1 of the above described information recording medium and the characteristic (ID) information is recorded during manufacture of the record medium so that the public key information cannot be rewritten by the user. The information provider 501 can therefore perform encoding compatible with a system that received a genuine license. Data encoded based on a public key copied by an illegal user can also only be decoded by a secret key paired with the public key recorded on track −1 of the same disk. A user who acquired an illegally copied public key does not have a secret key paired with the public key so the encoded decipher key cannot be decoded.

In the above described step 2, based on the public key having the verified license, the information provider 501 encodes a decipher key capable of being used in decoding of the distributed information and sends the decipher key to the information receiver device 502. When the information receiver device 502 receives the encoded distribution data, as shown in step 3 of FIG. 5, the secret key is loaded from the disk and the encoded decipher key is then decoded. In step 4 the decoding and memory storage of the encoded distributed information is performed by utilizing the now decoded decipher key.

The information recording medium and information processing device of the above described embodiment, comprise a record medium recorded with a secret key and a public key utilized in the public key code system on a region where access is normally prohibited or in other words a region different from the data record/reproduction region. Along with distributing common encoded data, the information provider encodes a decipher key for use in decoding the distributed data based on the public key of the licensed user, and distributes this decipher key. The information provider therefore does not have to perform encoding of the distributed information for each individual user, and the decipher key only needs to be encoded and sent to users based on the public key received from a genuine user wanting to decode the encoded information so that the encoding of large quantities of distribution data is simplified, and further, decoding of the distributed data is impossible for those users not having a medium recorded with the public key and the secret key. Thus, only users having a record medium that received the genuine license can decode the encoded data and record the data on a record medium such as a magnetic disk.

Third Embodiment

In the first embodiment, information such as encoded video or music information for distribution was changed into normal text with a secret key and recorded onto a disk.

In contrast, in the third embodiment, encoded text is recorded unchanged onto the disk, and deciphered during reproduction, in other words, decoded and output as normal text.

Figure 6:
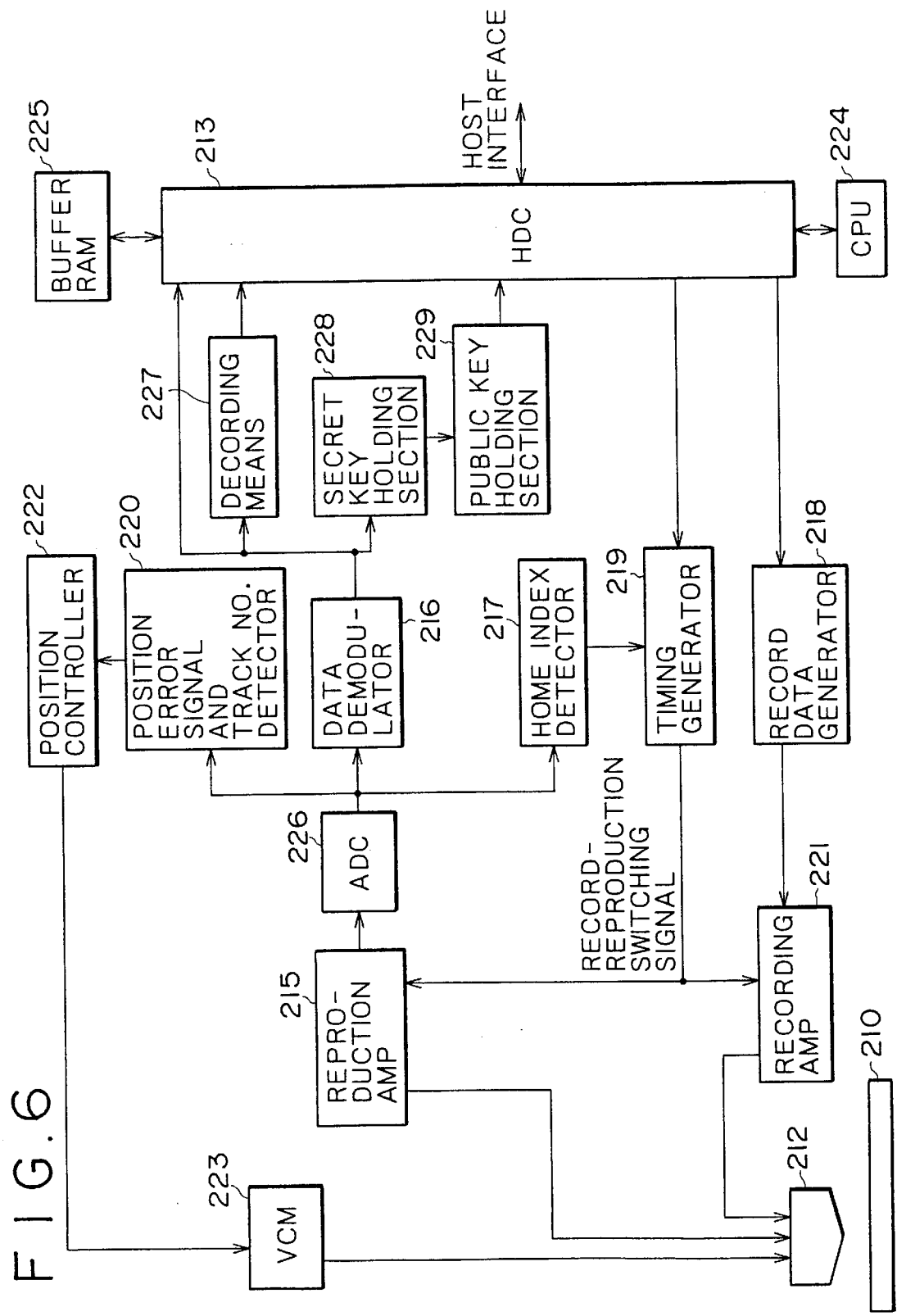
FIG. 6 is a block diagram showing the structure (third embodiment) of the information processing device of this invention.

A block diagram of the structure of the magnetic disk device of the embodiment of this invention is shown in FIG. 6.

In the magnetic disk device of this embodiment, the secret key and the public key of the public key code system, are recorded the same as in the first embodiment, on regions other than those regions assigned beforehand as normal data regions.

Accessing the information recorded on these dedicated data regions is performed by using vendor-unique commands (dedicated commands) the same as in the first embodiment, not defined by standards such as IDE. This embodiment, the same as the first embodiment, can also be satisfactorily applied to disk drive device types connected to general purpose computer systems by expanded IDE, SCSI or other interfaces. This embodiment is also applicable to systems utilizing PC card interfaces having various protocols (PC Card ATA 68pin ATA True IDE etc.) defined for hardware devices having PC card standards established by PCMCIA and JEIDA.

The secret key record command, and public key record/reproduction command, are defined as dedicated commands the same as for the first embodiment. In this embodiment, an encoding information reproduction command is further defined as dedicated command.

When this encoding information reproduction command loads (reads out) the secret key recorded on the record medium from host computer, the encoded information is then decoded by using the (reproduction) secret key.

In the structure of this embodiment, when information from the information provider such as external music or video for distribution is received by a genuine licensed device, a public key information load (read-out) command is first of all issued from the host computer.

When the HDC213 receives this public key information load (read-out) command, the head 212 is moved to a pre-designated position by the position controller 222, a signal is reproduced from the sector recorded with the public key information and transferred to the host computer via the hard disk controller 213.

The data for the applicable sector designated by the public key record address is loaded (read out) by issuing the public key information load (read-out) command defined as a dedicated command. In other words, the public key is read-out (or loaded). In the example for recording a public key on the sector position shown in FIG. 1, the public key information load (read-out) command is defined as a command for read out of data from Track −1, Sector No. 2.

The information provider encodes the information for distribution by using a common key that is read out and sent from the user system, and this information is distributed by utilizing removable media such as CD-ROMs and communication means such as broadcasts, networks.

When the information receiver constituted by the user, records information received by way of a network or provided by the information provider, such information is recorded on the disk the same as normal data. The distributed information is in this way recorded onto the disk while still encoded.

When reproducing information, a command from the host computer specifies it as information encoded by means of a public key and the information is then reproduced. The command in this case is an encoding information reproduction command defined as a dedicated command and the following processing is implemented by issuing this command.

When the encoding information reproduction command is issued, the head 211 moves to Track −1 of the magnetic disk 210 to load (read out) the secret key, the secret key data is read out from Track −1 of Sector No. 0, the secret key is reproduced by the data demodulator 216 and input to the secret key holding section 228.

The encoded signal for reproduction is input to the decoding means 227 by way of the data demodulator 216, and the encoding deciphered by utilizing the secret key input from the secret key holding section 228 and externally loaded by way of the HDC213.

The encoding information reproduction command designated as a dedicated command, implements a series of defined processes in which the secret key data is read out, the secret key reproduced by the data demodulator 216 and input to the secret key holding section 228, the encoded signal for playback input to the decoding means 227, and the encoding deciphered by utilizing the secret key input from the secret key holding section 228 and externally loaded by way of the HDC213. Loading (read out) the secret key externally by way of the HCD213 and host interface is impossible by means of this command, so tampering with the secret key is impossible.

The information recording medium and information processing device of the above described embodiment, comprise a record medium recorded with a secret key and a public key utilized in the public key code system on a region where access is normally prohibited, or in other words a region different from the data record/reproduction region. The information provider distributes encoded data by means of a public key, and the receiver constituted by the user records this on a storage medium, loads (reads out) the secret key when reproducing this data and acquires the decoded data. Therefore, in this embodiment, a user not possessing a medium recorded with a public key and a secret key cannot decode the distributed data, and only a user possessing a record medium that received a genuine license can decode the encoded data and reproduce the data.

The example in the above embodiment described a dedicated record region of a disk recorded with both a secret key and a public key of a public key code system, however recording just the secret key on the dedicated data record region may be performed so that only the secret key cannot be reproduced with the normal data record/reproduction commands.

Fourth Embodiment

In the second embodiment, information such as encoded video or music information was encoded using a common key and distributed, and in order to decipher that information, a decipher key was encoded with a characteristic public key for each user and sent. The user then changed the encoded distributed video or music information into common text and recorded it onto a disk.

In contrast, in the fourth embodiment, the encoded text is recorded unchanged onto the information distribution disk, and deciphered during reproduction, and output as common text.

Figure 7:
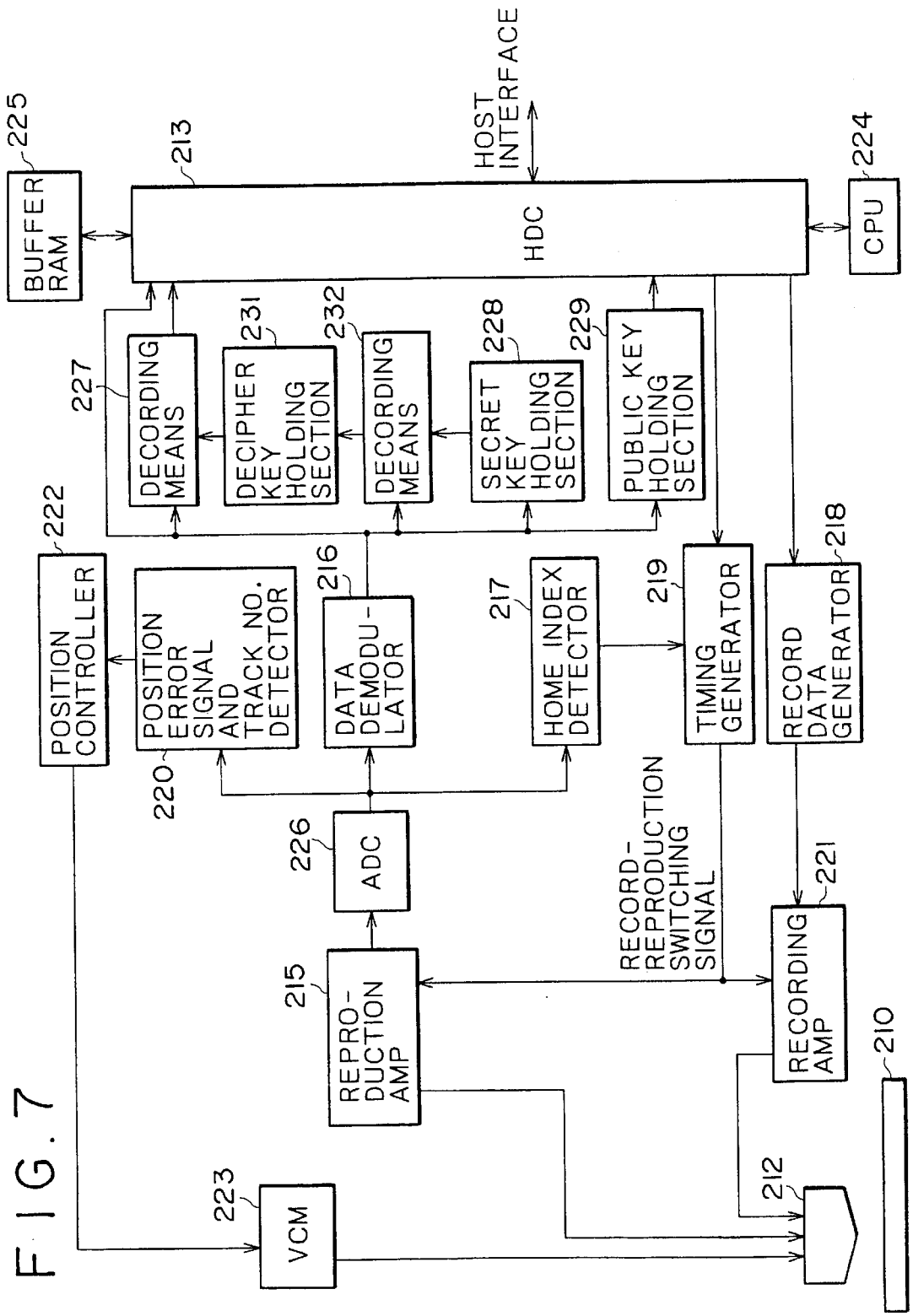
FIG. 7 is a block diagram showing the structure (fourth embodiment) of the information processing device of this invention.

A block diagram of the structure of the embodiment of the magnetic disk device of this invention is shown in FIG. 7.

In the magnetic disk device of this embodiment, the secret key and the public key of the public key code system, are recorded the same as in the first embodiment, on regions other than those regions assigned beforehand as normal data regions. For instance, the secret key and the public key are recorded on a specified sector of Track 1 as the dedicated data region as shown in FIG. 1. Access is therefore impossible during recording or reproduction of normal data. The readout of this data requires implementing a dedicated command, the same as in the first embodiment.

Accessing the information recorded on these dedicated data regions is performed by using vendor-unique commands (dedicated commands) the same as in the first embodiment, not defined by standards such as IDE. This embodiment of the invention, the same as the first embodiment, can also be satisfactorily applied to disk drive device types connected to general purpose computer systems by expanded IDE, SCSI or other interfaces. This embodiment is also applicable to systems utilizing PC card interfaces having various protocols (PC Card ATA 68pin ATA True IDE etc.) defined for hardware devices having PC card standards established by PCMCIA and JEIDA.

The secret key record command, and public key record/reproduction command, are defined as dedicated commands the same as for the first embodiment. In this embodiment, a decipher key decoding and encoding information reproduction command is further defined as dedicated command. When this decipher key decoding and encoding information reproduction command is input from the host computer by the host interface, an encoding decipher key and secret key are loaded from the disk, decoding of the decipher key implemented by the secret key, and further, the encoded information loaded from the disk is decoded by the decipher key.

In this embodiment, when external information for distribution such as video or music from the information provider is received by a genuine licensed device, a public key information loading command is first issued by a command from the host computer.

When this public key information loading command is received by the HDC213, the head 212 is moved to track designated beforehand by the position controller 222, the signal from the sector recorded with the public key information is reproduced, and sent to the host computer by way of the hard disk controller 213.

By specifying this public key information loading command defined as a dedicated command, the data is read out from the applicable track specified by the record address of the public key or in other words, the public key is loaded. In the example shown in FIG. 1, with the public key recorded in the sector position, the public key information loading command is defined as the loading (read out) command for the data of Track −1, Sector #2.

The information provider encodes the information for distribution by using a common key, and this information is distributed by utilizing removable media such as CD-ROMs, broadcasts, and networks such as the Internet and provided to undesignated number of receivers. The information provider also encodes the decipher key based on the public key loaded and sent from the user system. The decipher key is a key generated for use in decoding the distributed information that was encoded by using the common key.

In other words, the decipher key encoded based on the public key read out and sent from the user system can only be decoded by the secret key stored in the same user system. The decoding of the distributed data can then performed by the now decoded decipher key.

The information provider encodes the information for distribution by using a common key, and this information is distributed to non-designated receiver persons by removable media such as CD-ROMs, networks such as the Internet, and broadcasts. The information provider further encodes the decipher key based on the public key read out and sent from the user system and distributes the encoded decipher key to the user.

When the information receiver constituted by the user, records information received by way of a network or provided by the information provider, such information is recorded on the disk the same as normal data or in other words, is recorded onto the disk unchanged as encoded data. The decipher key encoded by means of the user public key and supplied from the information provider is also recorded on the disk, the same as with normal data.

When reproducing encoded information that is recorded on a disk, a command from the host computer specifies this as information capable of being decoded by means of an encoded decipher key and reproduces this information. In other words, the decipher key decoding and encoding information reproduction command is issued. When this decipher key decoding and encoding information reproduction command is input from the host computer by way of the host interface, the encoded decipher key and secret key are read out (loaded), the decipher key is decoded by using the secret key, and decoding of the encoded information loaded from the disk is also performed by using the decoded decipher key.

The procedure when reproducing and decoding encoded data from a disk is described next. First of all, the user issues the decipher key decoding and encoding information reproduction command. When the user issues this dedicated command, the encoded decipher key is read out (loaded) from the sector where recorded and input to the decoding means 232. Also, the head 212 is moved to Track −1 of the magnetic disk 210 to read out the secret key, the secret key data is loaded from Track −1, Sector #0, and the secret key reproduced by the data demodulator 216, the secret key is held in the secret key holding section 228, and decoding of the (encoded) decipher key implemented in the decoding means 232 by using the reproduced secret key. The decipher key generated by the decoding is held in the decipher key holding section 231.

The still encoded recorded information to be reproduced is input to the decoding means 227 by way of the data demodulator 216. The encoding is decoded by using the decipher key input from the decipher key holding section 231, and externally loaded by way of the HDC213.

The decipher key decoding and encoding information reproduction command defined as a dedicated command, is used for implementing a series of defined processes in which the secret key data, and decipher key are loaded from the disk, encoding information read out from the disk for decoding the decipher key with the secret key, and the encoded information deciphered with the decipher key. Only the loading (readout) of the secret key is implemented with this command or in other words, the secret key data cannot be extracted by way of the host interface so that tampering per read out of the user key by the user is prevented.

The information recording medium and information processing device of the above described embodiment, comprise a record medium recorded with a secret key and a public key utilized in the public key code system on a region where access is normally prohibited, or in other words a region different from the data record/reproduction region. The information provider along with distributing the common encoded data by means of a public key, also encodes the decipher key used to encode the distributed data based on the public key of the licensed user and distributes the decipher key to the user. The receiver constituted by the user, records this data on a storage medium, loads (reads out) the secret key when reproducing this data, decodes the decipher key, and further decodes the encoded information by using the decipher key. There is therefore no need for the information provider to encode the distribution information for each individual user, and only the decipher key (that was decoded based on the public key received from a genuine user wanting to decode the encoded information) is sent to the user. Therefore, the encoding of large quantities of distribution data is simplified, and further, the decoding of the distributed data is impossible for those users not having a medium recorded with the public key and the secret key. Thus, only users having a record medium that received a genuine license can decode the encoded data.

The above example described both a secret key and a public key for a public key code system recorded onto the dedicated data record region of the disk, however the method of recording only the secret key onto the dedicated record region, so that only the secret key cannot be reproduced with normal data record/reproduction commands may also be utilized.

Fifth Embodiment

The information recording medium and the information processing device of the fifth embodiment of this invention is described next. In this embodiment, the record region for the key used in the public key code system for the secret key and public key is located on the servo region of the disk.

Figure 8:
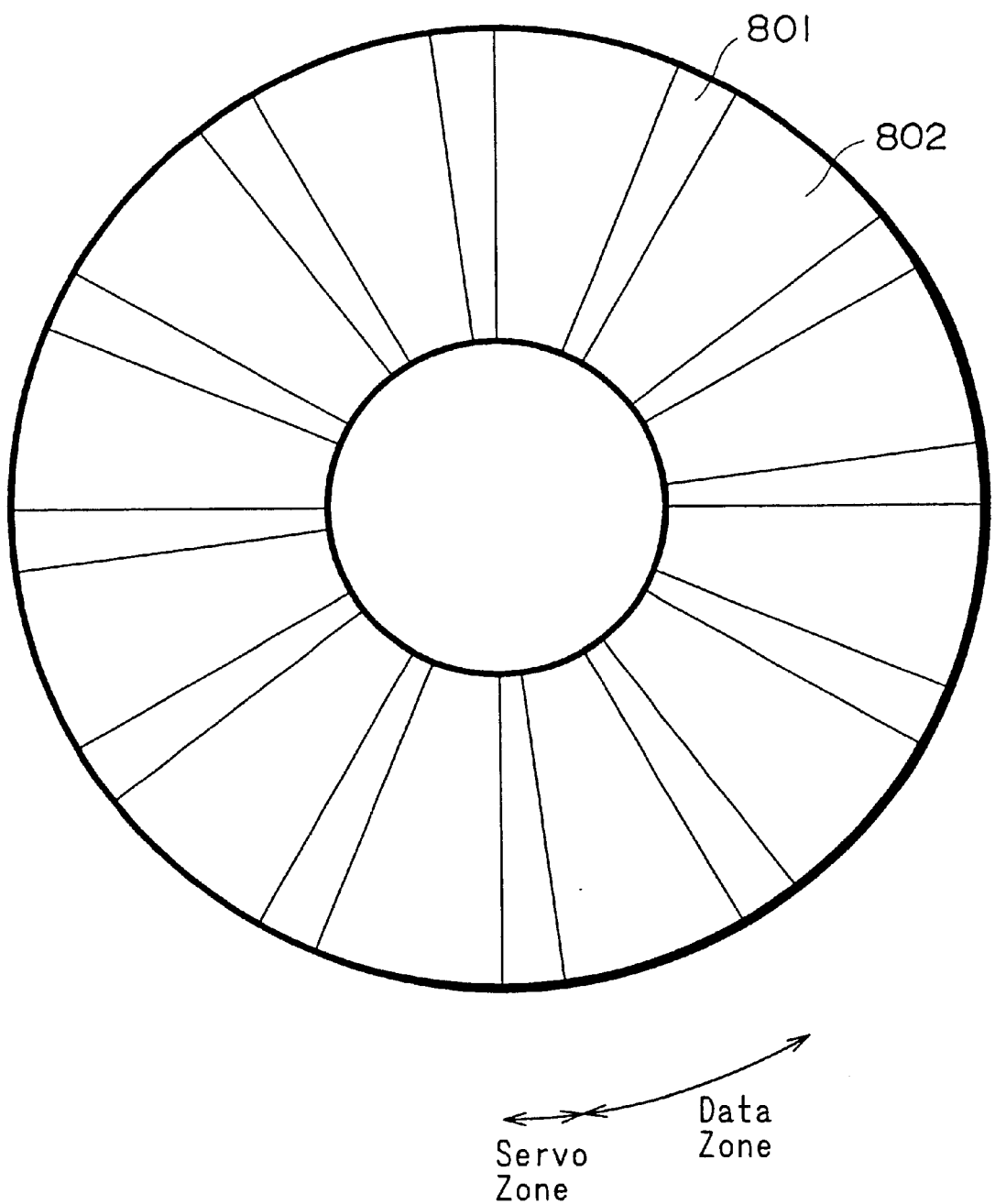
FIG. 8 is a drawing showing the disk format of a magnetic disk applicable to the information processing device having the information recording medium of the invention.

The magnetic disk capable of being used in the information processing device of the invention is shown in FIG. 8. The magnetic disk shown in FIG. 8 has servo zones 801 and data zones 802 alternately placed on the disk. The number of servo zones 801 shown in FIG. 8 is fewer than the actual number in order to avoid complicating the description, however an actual disk may have from several dozen to several hundred servo zones formed on one circumference of the disk. On a region recorded with the track address, one or a plurality of these servo zones is recorded with a dedicated pattern showing a reference point circumferentially on the disk or in other words showing a home index.

Figure 9:
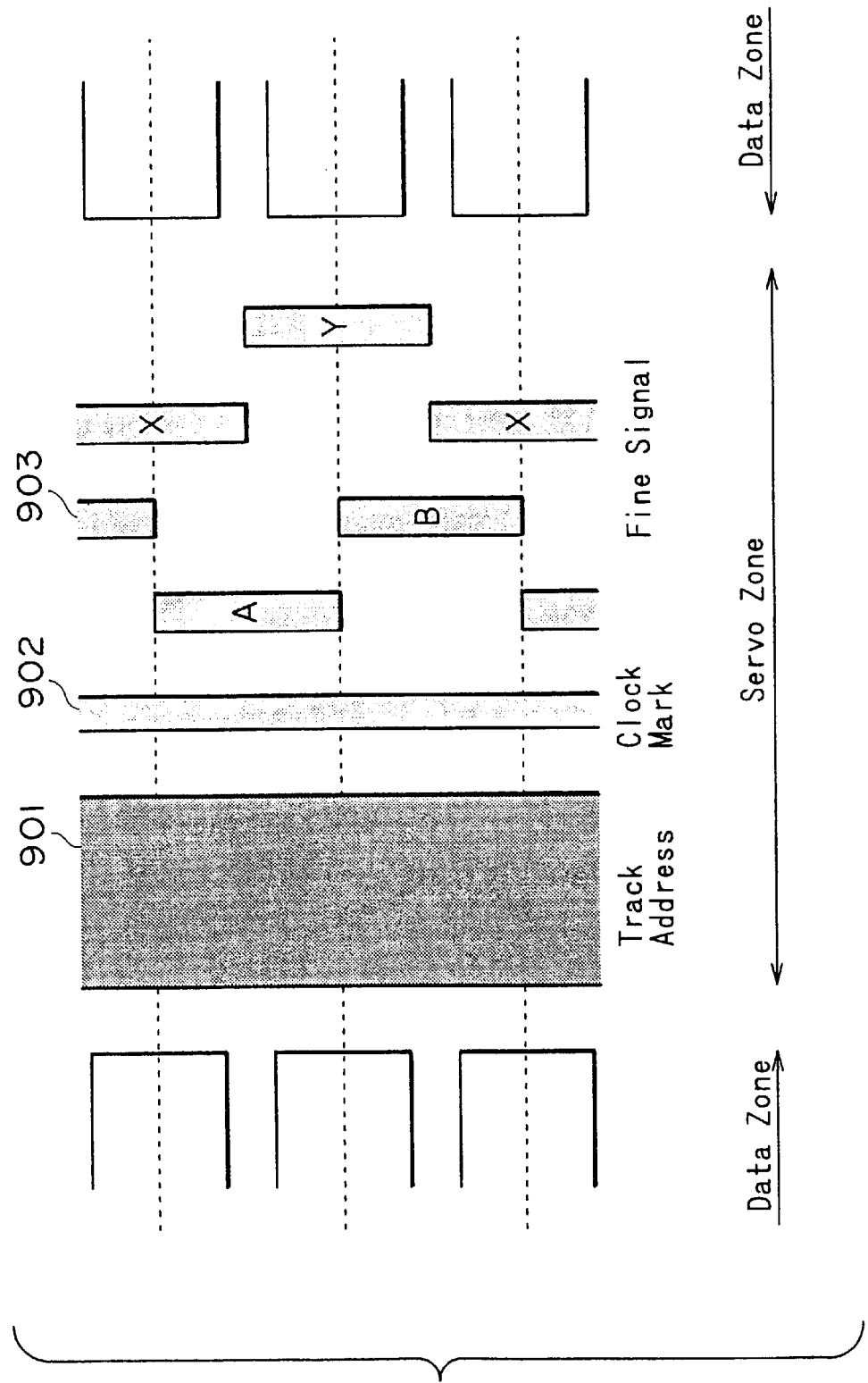
FIG. 9 is a drawing showing the structure of the servo zone for the magnetic disk applicable to the information processing device having the information recording medium of the invention.

A detailed drawing of the servo zone is shown in FIG. 9. On the servo zone shown in FIG. 9, the head is positioned at a specified position on the disk, and various marks and patterns are recorded or formed to allow writing of data or reproduction of data.

A track address 901 used to generate a servo signal for rough positioning in the seek operation, and a fine signal 903 for generating a servo signal for fine positioning to maintain on-track status are recorded on the servo zone. A clock mark 902 is also formed and used to generate clock pulses. These servo zones are formed at equally spaced intervals at several hundred points on each track circumference of the servo region to help generate high precision clock pulses and acquire an adequate servo signal.

Each type of signal within the above described servo zone 801 is briefly explained. An independent reproduced waveform is reproduced from the clock mark 902. In the independent reproduced waveform for instance, clock information synchronized with the rotation of the disk is obtained from the time that the peak is present.

Among the positioning servos for the magnetic head, the track seek mode requires a track address 901 to move the head to the target track. The track address 901 is encoded for instance into a gray code, and patterns with different lengths and positions formed so that each track is different.

The tracking mode, among the positioning servos for the magnetic head also requires a fine signal 903, to accurately move the head to the center of the target track. The fine signal is a pattern showing the relative positions of the head versus the track. The four magnetic patterns of the fine signal 903 are A, B, X, Y as shown in FIG. 9.

The rotation reference point on the magnetic disk is called the home index pattern, and is recorded usually on one point, on one disk circumference, in place of the above unique pattern, in the track address region. The circumferential position can be found by detecting the home index and counting the number of servo zones from the home index.

The servo information inside these servo zones is recorded beforehand, in the same state as arriving or leaving the storage medium, onto a device called a servo writer before being input to the storage device of a record medium such as a magnetic disk or in other words, a magnetic disk drive device. The servo writer possesses a means for accurately positioning the head and a means for achieving the correct timing, etc. The intricate control effected by these means causes the servo information to be recorded with high precision on the record medium. In the disk drive device for the disk written with this servo information, the radial position on the disk and the circumferential position on the disk can be known by reading the servo information with the head. In this way, the position of the head relative to the disk can be found, and data writing and data reading performed at the specific desired position.

In the structure of this embodiment, the secret key and the public key of the public key code system are recorded on these servo zones. More specifically, the secret key and the public key of the public key code system are respectively recorded on a portion of the region for recording the track address.

The data for the secret key and public key are recorded at pre-determined points by the servo writer, amidst a series of servo information recording procedures.

Figure 10:
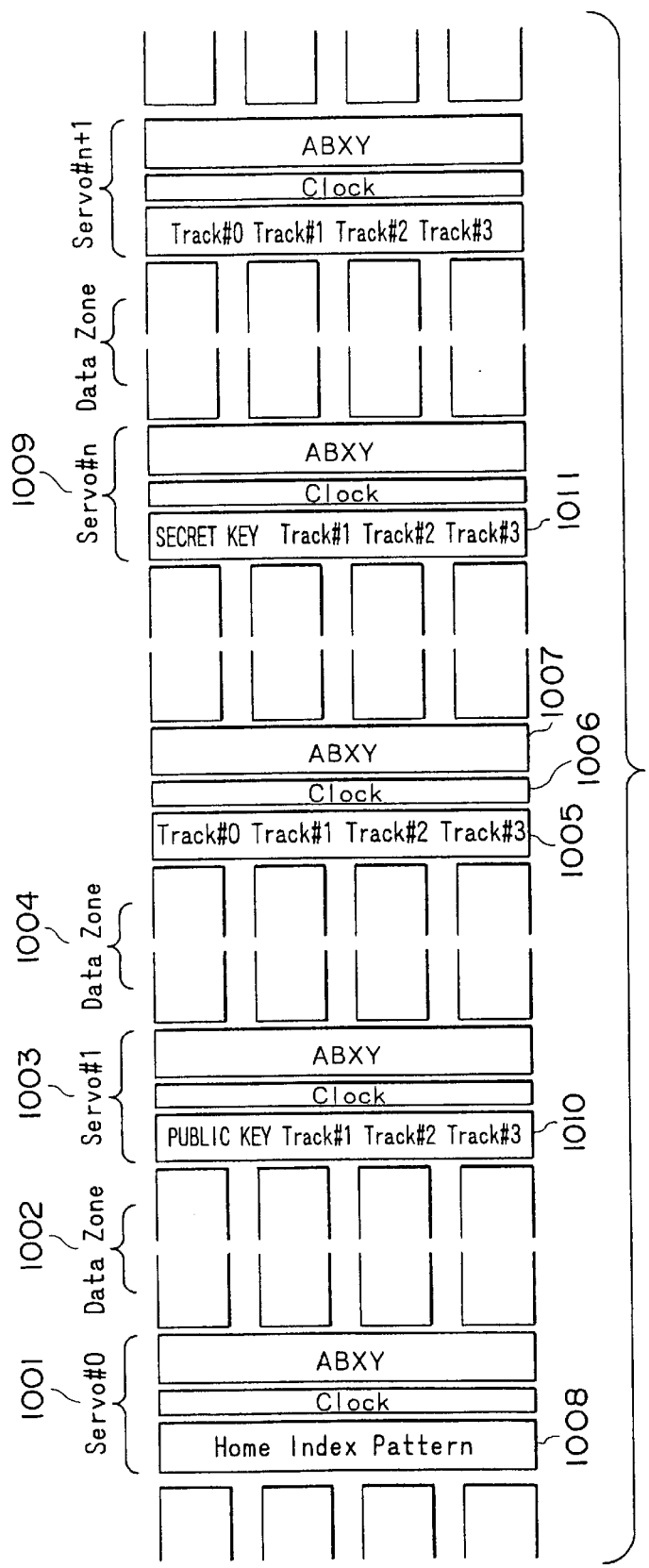
FIG. 10 is a drawing showing typical placement of key information for the disk in the information processing device having the information recording medium of the invention.
Figure 11:
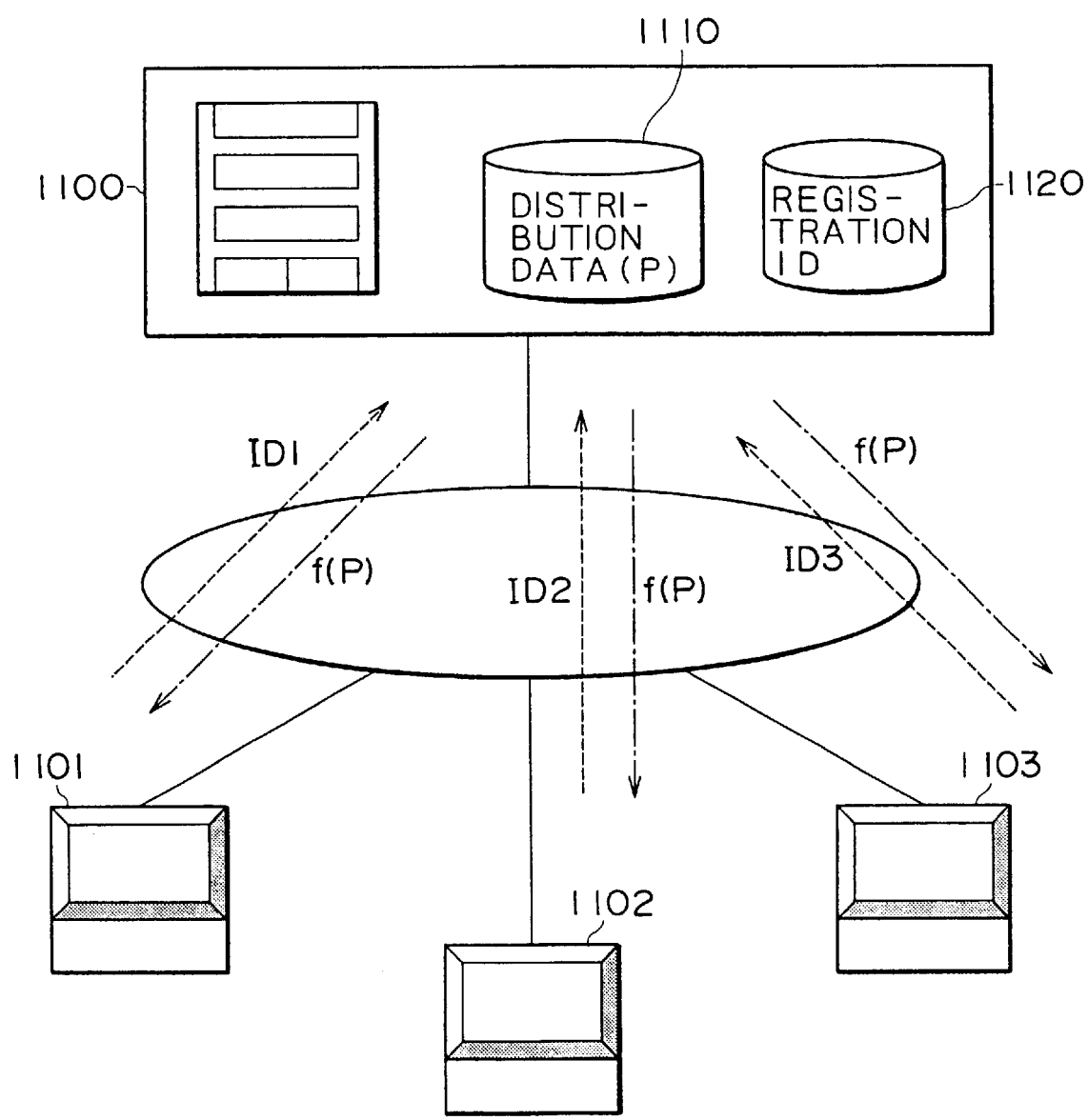
FIG. 11 illustrates a configuration in a communications network to prevent illegal copying.

A typical format of the magnetic disk as an example of the information recording medium of this invention is shown in FIG. 10. A diagrammatic drawing of a portion of the magnetic disk arrayed with alternate data zones and servo zones is shown in FIG. 10. The servo zone at the left edge of the figure is Servo#0 1001 or in other words, is the servo zone having the home index. A data zone 1002 is formed on the right adjacent to the Servo#0 1001. A Servo#1 1003, a data zone 1004 and, thereafter alternate data zones and servo zones are arrayed on the disk.

Each servo zone is formed with a track address 1005, a clock mark 1006, a fine signal 1007, the same as the servo zones shown in FIG. 9. A home index 1008 is formed in the servo zone Servo#0 1001.

A public key 1010 is recorded in the servo zone Servo#1 1003 as shown in FIG. 10, in the next servo region, after the servo region of the track address 0 home index. A secret key 1011 is recorded in the servo zone Servo#n 1009.

As shown in FIG. 10, the public key 1010 is recorded in the region recorded with the essential address data for Track 0 of the track address position of servo zone#1 1003. The secret key 1011 is recorded in the region recorded with the essential address data for Track 0 of the track address position of servo zone#n 1009.

Among the magnetic head positioning servos, the track seek mode as mentioned above, requires a track address to move the head to the target track. Several dozen to several hundred track addresses are recorded on each circumference of the disk and even if track addresses are not recorded at certain points among these addresses, track seek capability is amply available through other track addresses so that no problems occur.

The region recorded with the public key and secret key information is fixedly set at those recording locations beforehand. The public key and secret key information can be read out by means of the dedicated commands. However, the same as also described for the other embodiments, the secret key can be read out and decoding performed only during decoding of information, and the secret key cannot be externally loaded or tampered with.

The position that the public key and secret key information are written is essentially an address for writing the track address, and can be read out even during servo information read out when recording or reproducing data on a data zone. However, as previously explained, there are several dozen to several hundred track addresses recorded on each disk circumference, so that even if track addresses are not recorded at several positions among these addresses, and information different from servo information such as public key and secret information is read out during seek operation, track seek can still be performed by means of accurate track address data written in other servo zones.

The public key and secret key information is recorded within servo zones by the servo writer, the same as servo signals in the servo zone.

Recording new public key and secret key information is impossible after incorporating a magnetic recording medium (disk, etc.) recorded with this public key and secret key information into, for instance a magnetic disk drive device, or personal computer device. Rewriting (overwriting) and erasure are also impossible. Therefore, illegally writing or rewriting public key and secret key information is impossible for the general user possessing a magnetic disk device.

Also, in systems for distributing information such as music or video sent by an information provider over a network such as the Internet to a non-designated large number of users, by implementing encoding or decoding that utilizes individual public key and secret key information during the recording or reproduction of that information onto a storage device, illegal copying or illegal reproduction can be prevented.

When a large number of bits are required in the public key and secret key information, a number of servo regions present on the disk can be linked together or several scattered points may be utilized to comprise information for one open key and secret key.

When a 12 bit region is for instance assigned to each servo zone as the track address recording region, only 12 bit data can be used as the public key and secret key information record regions. However, long public key and secret key information with a long data length can be recorded by using a plurality of track address record regions.

For instance, if eight servo zones comprising the servo zone next to the home index, the first servo zone counting from the home index, the mth servo zone counting from the home index, the nth servo zone counting from the home index, the oth servo zone counting from the home index, the pth servo zone counting from the home index, the qth servo zone counting from the home index, the rth servo zone counting from the home index, are used as key information recording regions, then a total of 96 bits of information can be recorded.

In order to prevent being unable to reproduce information due to damaged key information on the disk, recording the key information beforehand on a plurality of locations on different regions is effective and can enhance the fail-safe characteristics. Other methods for instance, are preparing key information recording areas on the inner circumference and outer circumference, or using different surfaces of the disk, etc.

A disk recorded on the servo zones in this way, with a public key used for encoding, and a secret key used for decoding, is applicable to the above first through fourth embodiments.

The above example described recording both a secret key and a public key for a public key code system on servo zone regions, however recording only the secret key onto the dedicated record region may also be performed, so that only the secret key cannot be reproduced with normal data record/reproduction commands.

This invention was described while referring to the above designated embodiments. However, as is clear to one skilled in the art, amendments and substitutions may be effected without departing from the scope or spirit of the invention. In other words, the above descriptions are intended as examples for disclosing the invention and are not to be interpreted as limiting the invention. The section containing the claims of this invention should be referred to in order to determine the scope and intent of the invention.

In the information recording medium and information processing device of this invention as described above an effect is rendered that, a secret key and a public key with characteristic information are recorded on a medium, and a secret key for decoding the encoded information is recorded on a region of the medium not capable of being normally accessed so that the user is prevented from using external commands to read out and tamper with the key. Also recording and/or reproduction on this device is only possible with information encoded by the characteristic public key of the device. Illegal copying can be prevented and copyrights to software such as computer programs, and to music and video can be effectively protected.

In another effect of the information recording medium and information processing device of this invention according to the encoded information is recorded and reproduced as normal text by the secret key so that information encoded with the device characteristic public key is only decodable with the device characteristic secret key, and only a user possessing a genuine licensed device can record or reproduce the encoded information.

In still another effect of the information recording medium and information processing device of this invention according to the encoded decipher key is made into normal text by the secret key and in this way, encoded information is recorded or reproduced as normal text, so that along with the information provider jointly encoding information such as video and music and distributing such information to an undetermined large number of users, by encoding only the decipher key as the device characteristic (ID) key, and by decoding the decipher key only with the device characteristic (ID) secret key, only a user possessing a genuine licensed device can therefore record or reproduce the encoded information.

In yet another effect of the information recording medium and information processing device of this invention according to a secret key is recorded on servo zones by using a special and high-priced device called the servo writer, so that only reproducing information while in the memory storage state is possible and rewriting of the information is impossible.

An even further effect of the information recording medium and information processing device of this invention is that recording is performed on regions that are not data regions so that readout outside the device is impossible with normal data read-out commands, and therefore external read-out of the secret key can be made impossible. Therefore the invention cane used for record or reproduction for instance, of pay type distributed music information and tampering with this information used for decoding of encoded information is extremely difficult.

What is claimed is:

1. A disk information recording medium capable of recording and reproducing data, comprising:

a data zone capable of recording or reproducing data; and a plurality of servo zones recorded with servo information for positioning a head with respect to said information recording medium for recording and reproducing of data;

wherein each of two or more of said plurality of servo zones are recorded with at least a part of a secret key as key information for a public key coding system, and wherein said key information of said public key coding system is formed into one key information by linking the information recorded in the plurality of servo zones.

* * * * *